(12) United States Patent
Lieske et al.

(10) Patent No.: US 8,190,856 B2
(45) Date of Patent: May 29, 2012

(54) DATA TRANSFER NETWORK AND CONTROL APPARATUS FOR A SYSTEM WITH AN ARRAY OF PROCESSING ELEMENTS EACH EITHER SELF- OR COMMON CONTROLLED

(75) Inventors: Hanno Lieske, Tokyo (JP); Shorin Kyo, Tokyo (JP)

(73) Assignee: NEC Corporation, Minato-ku, Tokyo (JP)

( * ) Notice: Subject to any disclaimer, the term of this patent is extended or adjusted under 35 U.S.C. 154(b) by 452 days.

(21) Appl. No.: 12/449,977

(22) PCT Filed: Mar. 6, 2007

(86) PCT No.: PCT/JP2007/054756
§ 371 (c)(1),
(2), (4) Date: Sep. 4, 2009

(87) PCT Pub. No.: WO2008/108005
PCT Pub. Date: Sep. 12, 2008

(65) Prior Publication Data
US 2010/0088489 A1    Apr. 8, 2010

(51) Int. Cl.
*G06F 15/16* (2006.01)
*G06F 15/173* (2006.01)
*G06F 15/80* (2006.01)
(52) U.S. Cl. ........................................ 712/20
(58) Field of Classification Search ............... 712/20, 712/21, 22
See application file for complete search history.

(56) References Cited

U.S. PATENT DOCUMENTS

| | | | |
|---|---|---|---|
| 3,537,074 A | 10/1970 | Stokes et al. | |
| 4,837,676 A | 6/1989 | Rosman | |
| 5,050,065 A | 9/1991 | Dartois et al. | |
| 5,212,777 A | 5/1993 | Gove et al. | |
| 5,239,654 A | 8/1993 | Ing-Simmons et al. | |
| 5,355,508 A | 10/1994 | Kan | |
| 5,522,083 A | 5/1996 | Gove et al. | |
| 5,903,771 A | 5/1999 | Sgro et al. | |
| 6,487,651 B1 | 11/2002 | Jackson et al. | |
| 7,818,541 B2 * | 10/2010 | Rhoades et al. | ................ 712/22 |

OTHER PUBLICATIONS

Shorin Kyo, et al., "An Integrated Memory Array Processor Architecture Embedded Image Recognition Systems", 2005, Proceedings of the 32nd International Symposium on Computer Architecture (ISCA'05) 12 pages.

* cited by examiner

*Primary Examiner* — William M Treat
(74) *Attorney, Agent, or Firm* — McGinn Intellectual Property Law Group, PLLC (57) ABSTRACT

A processor of SIMD/MIMD dual mode architecture comprises common controlled first processing elements, self-controlled second processing elements and a pipelined (ring) network connecting the first PEs and the second PEs sequentially. An access controller has access control lines, each access control line being connected to each PE of the first and second PEs to control data access timing between each PE and the network. Each PE can be self-controlled or common controlled, such as dual mode SIMD/MIMD architectures, reducing the wiring area requirement.

14 Claims, 7 Drawing Sheets

DATA TRANSFER NETWORK AND CONTROL APPARATUS FOR A SYSTEM WITH AN ARRAY OF PROCESSING ELEMENTS EACH EITHER SELF- OR COMMON CONTROLLED

FIELD OF THE INVENTION

The present invention relates to an architecture design for data transfer bandwidth cost reduction, particularly, to measures for wiring area reduction, and a control method for architectures with processing elements, each can be either self-controlled or common controlled, to reach an optimized design regarding area requirements while offering maximal dual mode processor flexibility.

BACKGROUND OF THE INVENTION

By now, many processors operating in the single instruction, multiple data stream (SIMD) style or the multiple instruction stream, multiple data stream (MIMD) style have been proposed. While processor of the first mentioned style, whose architecture has been disclosed in Reference 1, are mostly used for processing computationally expensive, data independent low-level tasks with regular data and control flow or medium-level tasks with their regular data access but irregular data and control flow, processor of the second mentioned style, whose architecture has been disclosed in Reference 2, work on irregular input data with irregular data and control flow. This results in the problem that the SIMD processors are wasting unoccupyable processing elements (PEs) in tasks with irregular input data, while the MIMD processors are wasting unoccupyable logic in tasks with regular input data.

Many upcoming algorithms, like for example H.264, are made up of a number of sub algorithms which follow partly the SIMD control style and partly the MIMD control style. Therefore, new dual mode SIMD/MIMD architectures have been proposed, which are mainly starting from an MIMD approach and attaching an additional crossbar to enable SIMD functionality. Examples are References 3 to 6. Other approaches have a fixed percentage of SIMD and MIMD processing power by either adding each fixed number of SIMD units and MIMD units, like in Reference 7, or by adding to an array of processing elements without memory control ability a number of so called user computers with memory control capability as suggested in Reference 8.

The references are listed below.
[Reference 1] R. A. Stokes et al., "Parallel operating array computer", U.S. Pat. No. 3,537,074, Oct. 27, 1970
[Reference 2] A. Rosman, "MIMD instruction flow computer architecture", U.S. Pat. No. 4,837,676, Jun. 6, 1989
[Reference 3] R. J. Gove et al., "Multi-processor reconfigurable in single instruction multiple data (SIMD) and multiple instruction multiple data (MIMD) modes and method of operation", U.S. Pat. No. 5,212,777, May 18, 1993
[Reference 4] N. K. Ing-Simmons et al., "Dual mode SIMD/MIMD processor providing reuse of MIMD instruction memories as data memories when operating in SIMD mode", U.S. Pat. No. 5,239,654, Aug. 24, 1993
[Reference 5] R. J. Gove et al., "Reconfigurable multi-processor operating in SIMD mode with one processor fetching instructions for use by remaining processors", U.S. Pat. No. 5,522,083, May 28, 1996
[Reference 6] J. A. Sgro et al., "Scalable multi-processor architecture for SIMD and MIMD operations", U.S. Pat. No. 5,903,771, May 11, 1999
[Reference 7] T. Kan, "Parallel data processing system combining a SIMD unit with a MIMD unit and sharing a common bus, memory, and system controller", U.S. Pat. No. 5,355,508, Oct. 11, 1994
[Reference 8] J. H. Jackson et al., "MIMD arrangement of SIMD machines", U.S. Pat. No. 6,487,651, Nov. 26, 2002

SUMMARY OF THE DISCLOSURE

The disclosures of the above references are incorporated herein by reference thereto and should be referred to upon needs.

According to the analysis based on the present invention, all those approaches have in common that they need a complex crossbar for data transfer between external memory and processing elements with internal memory which results for the data bus in large wiring area requirements for architectures with processing elements, each can be either self-controlled or common controlled, such as dual mode SIMD/MIMD architectures. Thus there is much desired in the art.

Accordingly, it is an object of the present invention to provide a novel processor or processing system having a plurality of processing elements in which the wiring area needs for connecting the PEs can be reduced.

It is another object of the present invention to provide a novel solution for a processor or processing system with an array of PEs, each either self- or common controlled.

It is a further object of the present invention to improve a processor or processing system having an array of PEs, such that each can be either self- or common controlled with respect to the wiring area requirement for data bus.

Other objects of the present invention will become apparent in the entire disclosure.

According to the present invention, the reduction is achieved by using a pipelined bus system, preferably formed as a ring, connecting all processing elements and a global data transfer control unit sequentially, in general.

Specifically the present invention provides various aspects.

According to a first aspect of the present invention, there is provided a processor comprising: first processing elements that execute the same program of a common controller; second processing elements that execute their own program independently from other processing elements programs; and a pipelined network connecting the first processing elements and the second processing elements sequentially.

In a second aspect, the processor further comprises: an access controller with access control lines, each access control line being connected to each processing element of the first and second processing elements to control data access timing between each processing element and the network.

In a third aspect, the relation of the data access timings from the first processing elements and the data access timings from the second processing elements is different.

In a forth aspect, the data access for the first processing elements is a concurrent access so that each of the first processing elements accesses the network at a same timing slot; and the data access for the second processing elements is a standalone access so that each of the second processing elements accesses the network independently.

In a fifth aspect, the access controller controls the network so as to achieve an increased (high) efficiency in the use of the network.

In a sixth aspect, the access controller controls the network so as to achieve to hold a specified bus access waiting time for one processing element.

In a seventh aspect, the access controller assigns higher priority to one standalone access than to the concurrent access or to the other standalone accesses when assigning the data access timing to each processing element.

In a eighth aspect, the access controller assigns higher priority to the concurrent access than the standalone access when assigning the data access timing to each processing element.

In a ninth aspect, the access controller controls the network so as to hold a specified bus access waiting time for each processing element.

In a tenth aspect, the access controller decides the data access timing of each processing element to minimize the necessary duration to send the required data.

In a eleventh aspect, processing elements are configurable to the first processing element and the second processing element; and the access controller decides which processing element is used as the first processing element and which processing element is used as the second processing element.

In a twelfth aspect, the processor further comprises an arbitration unit that arbitrates demand of data transfer for the first and second processing elements.

In a thirteenth aspect, the first processing element comprises a SIMD architecture processing element; and the second processing element comprises a MIMD architecture processing element.

In a fourteenth aspect, the pipelined network is a pipelined ring network.

In a fifteenth aspect, there is provided an access controller having access control lines, wherein each access control line is connected to each of processing elements via access control lines; the processing elements comprising: first processing elements that execute the same program of the access controller, and second processing elements that execute their own program independently from other processing elements programs the first and second processing elements being sequentially connected with a pipelined network; and the access controller controls data access timing between each processing element and the pipelined network.

In still further aspects, the access controller may be formulated in association with any one of the processors as mentioned herein as the preceding aspects, In a further aspect, there is provided a processing method comprising: executing the same program of a common controller by first processing elements; executing own program independently from other processing elements programs by second processing elements; and connecting the first processing elements and the second processing elements sequentially through a pipelined network.

In a still further aspect, there is provided a method of controlling an access controller having access control lines, comprising: providing each access control line connected to each processing element; the processing elements being controlled by the steps comprising: executing the same program of the access controller by first processing elements, and executing own program independently from other processing elements programs by second processing elements, sequentially connecting the first and second processing elements with a pipelined network; and controlling data access timing between each processing element and the pipelined network by the access controller.

The meritorious effects of the present invention are summarized as follows.

Two positive effects are achieved on the chip area requirements. First, the number of connections of all data signals to the global data transfer control unit will be reduced to 1/number_of_processing_elements which results in less needs of wiring area around this unit. Further on, the wiring length of these data signals can be reduced, so that special driver cells which would otherwise be necessary to prevent critical path length problem can be eliminated.

EXPLANATION OF NUMERALS

101: Global Control Unit (GCU), including instruction cache and data cache, serving as a common controller for common controlled processing elements (PEs)
102: Self-controlled PE, PE is using own control unit
103: Common controlled PE, PE is using common control unit in GCU
104: Pipelined ring bus with registers (R) for data signal transfer
201: Arbiter, composed of main arbitration unit, pre-arbitration unit and access controller
202: Main arbitration unit inside arbiter
203: Pre-arbitration unit for self-controlled PE requests, formed of request selection and request parameter decimation logic
204: Access Controller controlling access timing between PEs and network
205: GCU, including instruction cache, data cache and a PE IMEM data transfer control unit for common controlled PEs
301: Selector to control the control signals which are transferred to self-controlled and common controlled PEs
302: PE IMEM
303: Control lines
401: PE with IMEM and ring bus register R
402: GCU with external memory arbiter for data signal transfer control
403: Access control lines to control access timing between PE and network
404: Unidirectional pipelined ring bus for data signal transfer

PREFERRED MODES

Figure 1:
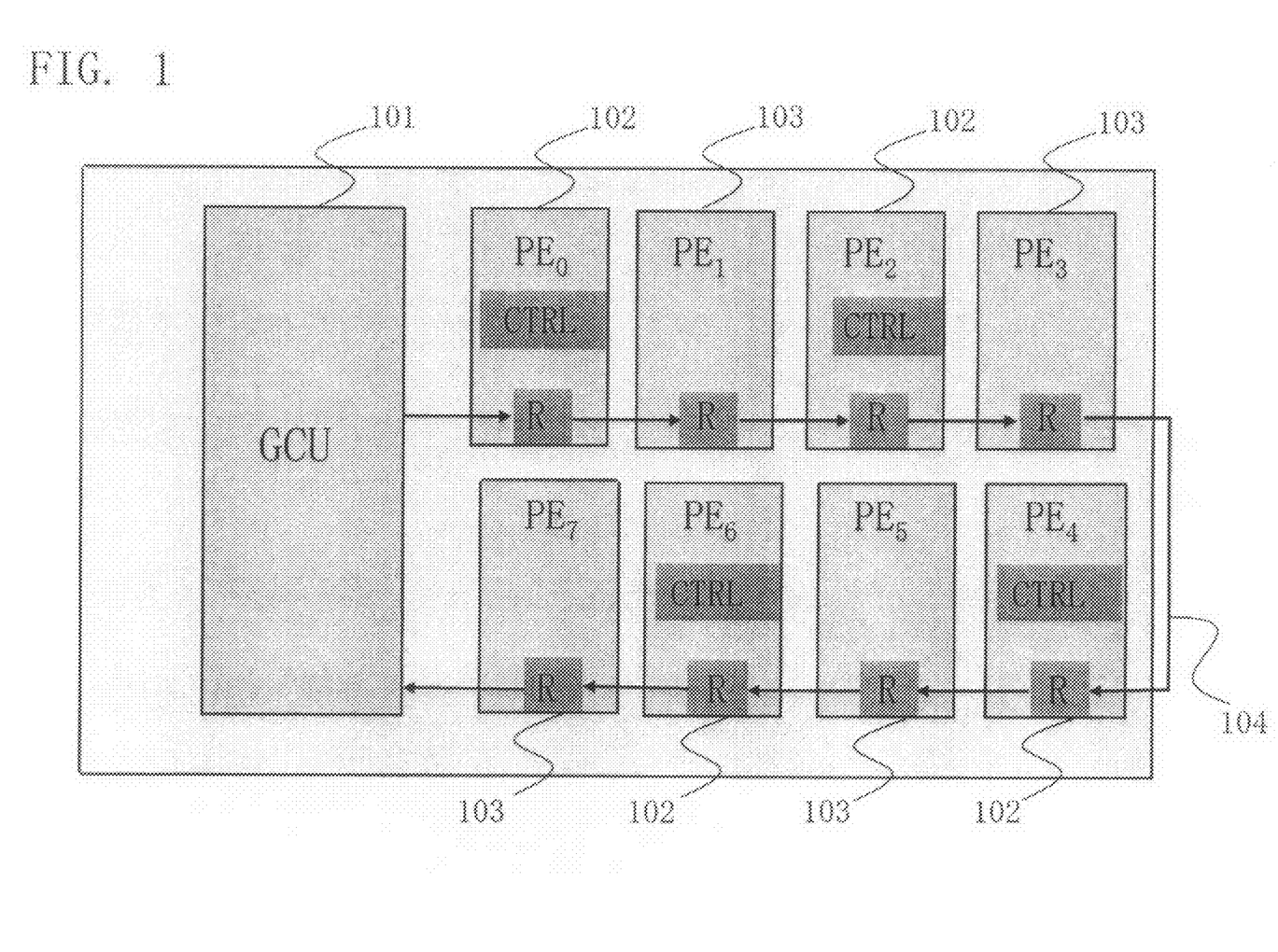
FIG. 1 is a schematic illustration of an 8 PE architecture, each can be either self-controlled or common controlled, with a pipelined data transferring network connected to a GCU.

FIG. 1 shows an example of architecture implementation with global control unit 101, an array of 8 processing elements, each can be either self-controlled 102 or common controlled 103, and the pipelined bus 104 as data transfer network connecting the GCU and all PEs sequentially. While for each PE, the operation mode is chosen freely by a mode decision unit, for this example, all odd PEs are common controlled and all even PEs are self-controlled.

Figure 2:
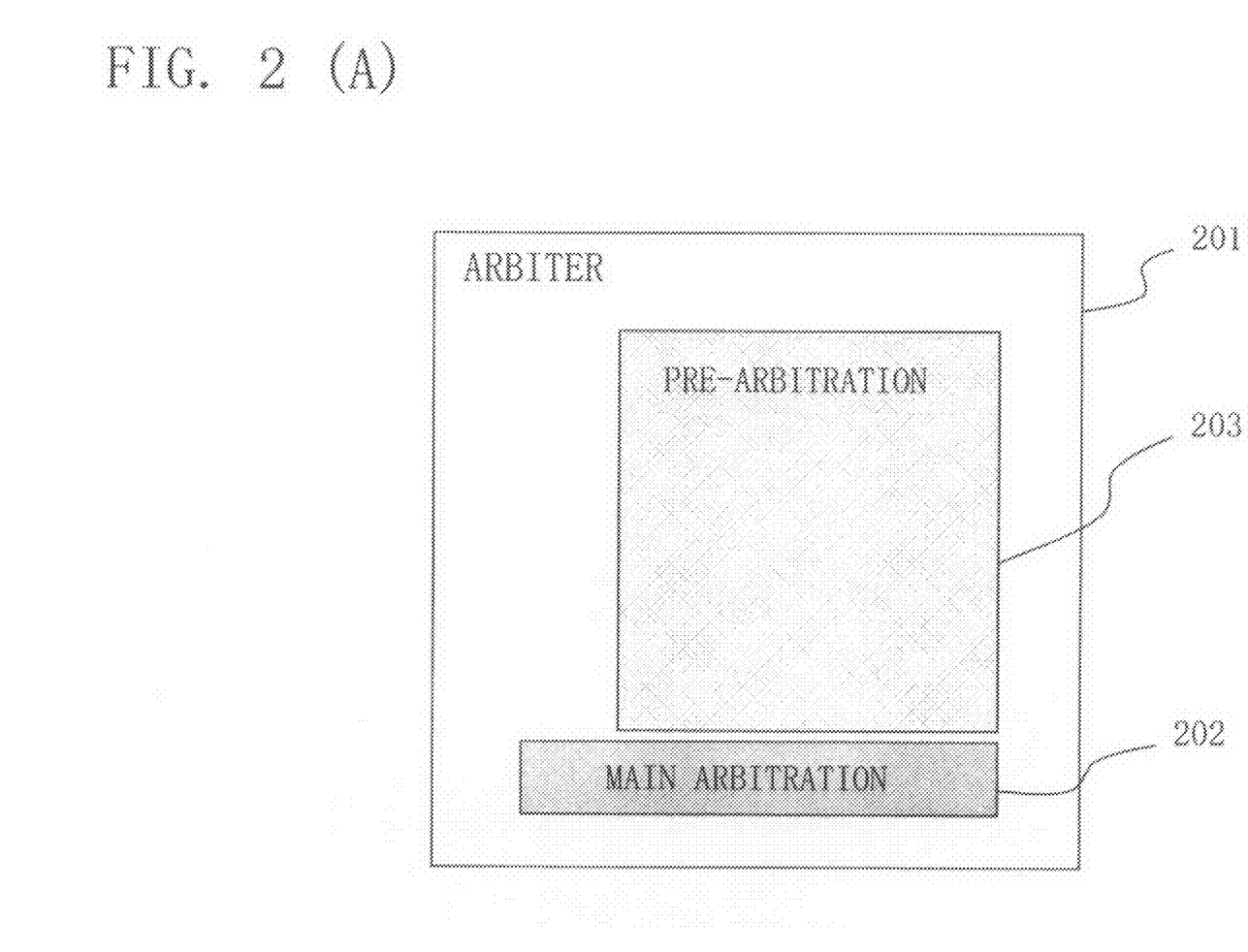
FIG. 2 is a schematic illustration of an example arbiter for external memory access.

To enable in such kind of architecture the data transfer from the PEs to an external memory, an external memory arbiter 201 has to be added. In this arbiter the requests from GCU for common controlled PEs and the requests from all self-controlled PEs are handled as shown in FIG. 2. This handling can be done in different ways, by first, giving the priority to the global controller request if the common controlled PEs are working on tasks which are more urgent to continue, or by second, giving the priority to a single self-controlled PE if this self-controlled PE is working on a task which is more urgent to continue. Other possibilities are to give the priority in such way, that the necessary duration to send data is minimized or like used here in this example, for equal priority request sources by giving access to a unit which had for the longest time no access.

Overall in this example, four different request types have to be arbitrated by the main arbitration unit 202, three from GCU 205, named instruction cache, data cache and PE IMEM data transfer control for common controlled PEs, and one from the self-controlled PEs, the PE's IMEM request. Because the last request can arrive from every self-controlled PE, first, like in this implementation example done for self-controlled PEs with equal priority, a selection of the next accepted active self-controlled PE can be done in a pre-arbitration logic 203 formed of a request selection logic and a parameter decimation logic. The request selection logic is constructing in a first step a request tree from leaf nodes to root with PE requests forming the leaf nodes information and doing an "OR"-operation to receive the child's parent node's information. In a second step, the longest inactive and now requesting PE is searched by going through the tree from root to leave nodes with additional update of the parent's "last child taken"-information. After this, the parameters from the active PE are taken and passed to the main arbitration unit inside the arbiter (unit) by a request parameter decimation logic, which can be constructed like in the example implementation by a simple "OR"-gate if the information about the current active PE is sent to all PEs and the current inactive PEs disable their request parameters by sending zero vectors. The decision, whether a PE is running in self-controlled mode or common controlled mode, is performed inside the access controller (unit) 204 of the arbiter. This assignment (allocation) can be changed during run-time to achieve a high efficiency of the network.

Figure 3:
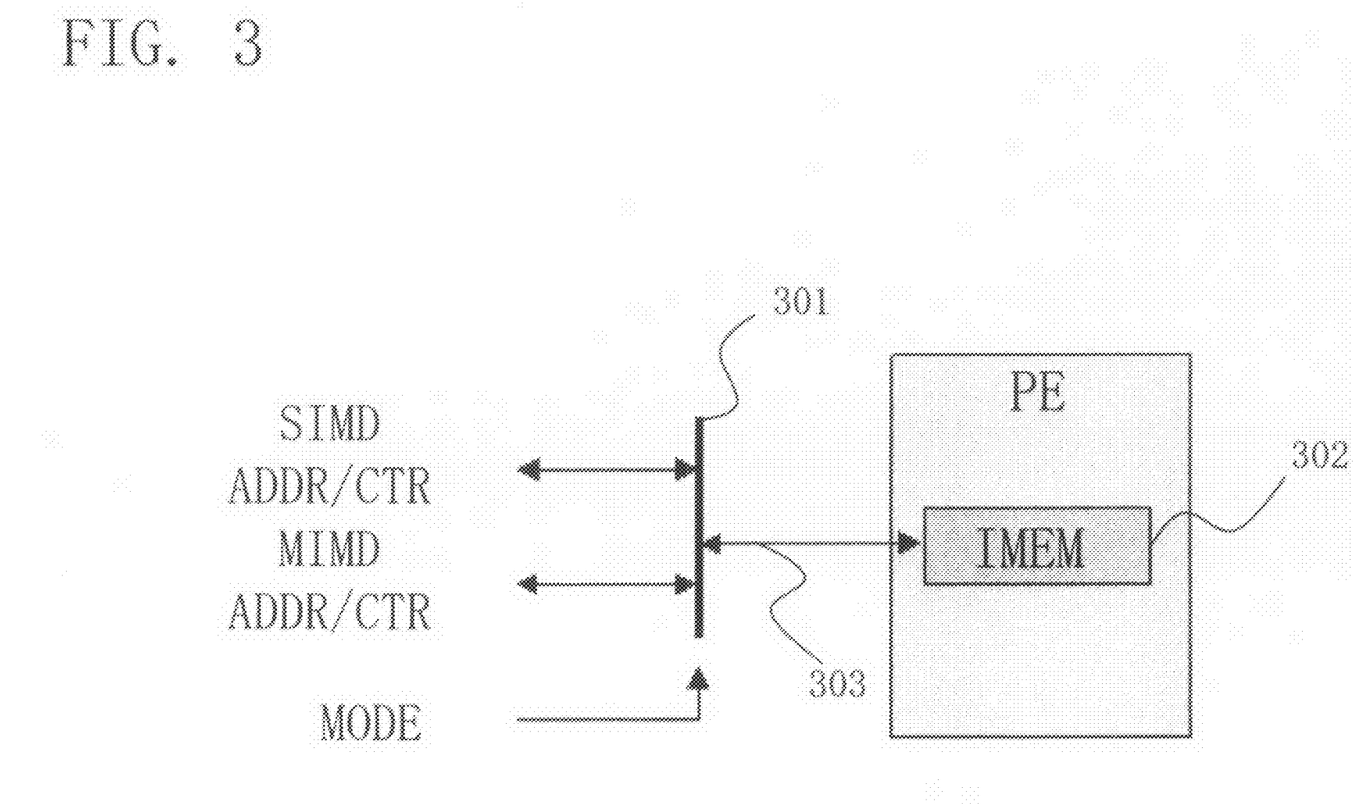
FIG. 3 is a schematic illustration showing the way of using the signal selection logic for controlled access to PE internal memory (IMEM) units.

By selecting depending on the mode over a selector (unit) 301 the correct control lines 303 for the PE IMEM units 302 inside the arbiter, different access types for self-controlled and common controlled PEs can be executed (FIG. 3). While for a data transfer to a self-controlled PE only one IMEM is accessed at a time, all common controlled PE IMEM units are accessed at the same time in case with a data transfer to common controlled PEs.

Figure 4:
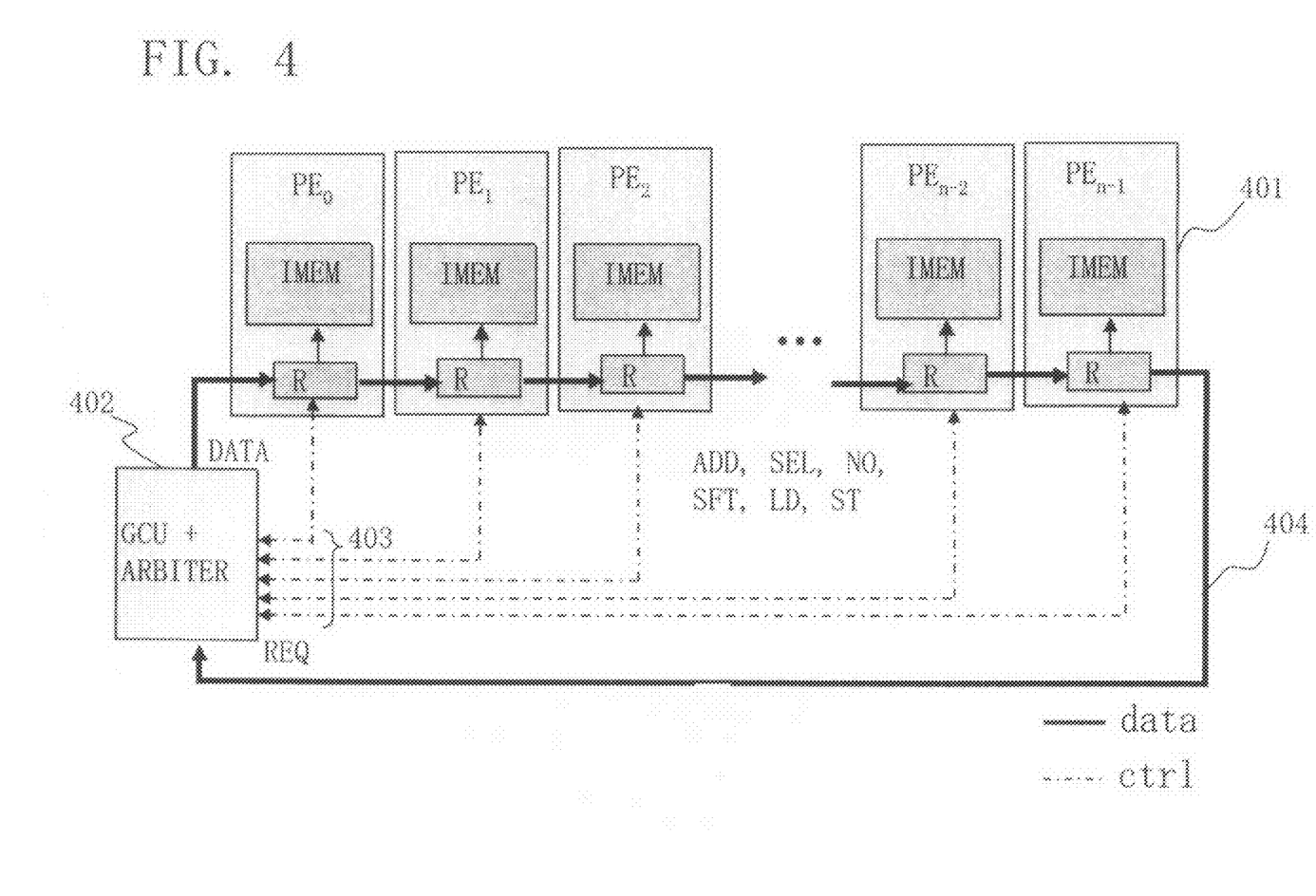
FIG. 4 is a schematic illustration of the data and control signal transfer network in an example dual mode SIMD/MIMD architecture.

An implementation example of the architecture with PEs 401, each can be either self-controlled to enable MIMD type or common controlled to enable SIMD type processing, including IMEM and ring bus register R, and GCU with external memory arbiter 402 is the dual mode SIMD/MIMD architecture shown in FIG. 4. However, without limiting the concept, instead of MIMD controlled PEs, also MISD (multiple instruction, single data) controlled PEs could have been chosen. The transfer network in this example architecture is done in such way that the control lines 403 for address and control signals between PEs and GCU with external memory arbiter are non-pipelined, direct connected signals while data signals are transferred over a unidirectional pipelined ring bus system 404 which results first in less needs of wiring area and second in a reduced critical path length. Further on, such bus system enables data transfer from the arbiter to PE IMEM as well as from PE IMEM to the arbiter without bidirectional network problems.

EXAMPLES

Figure 5:
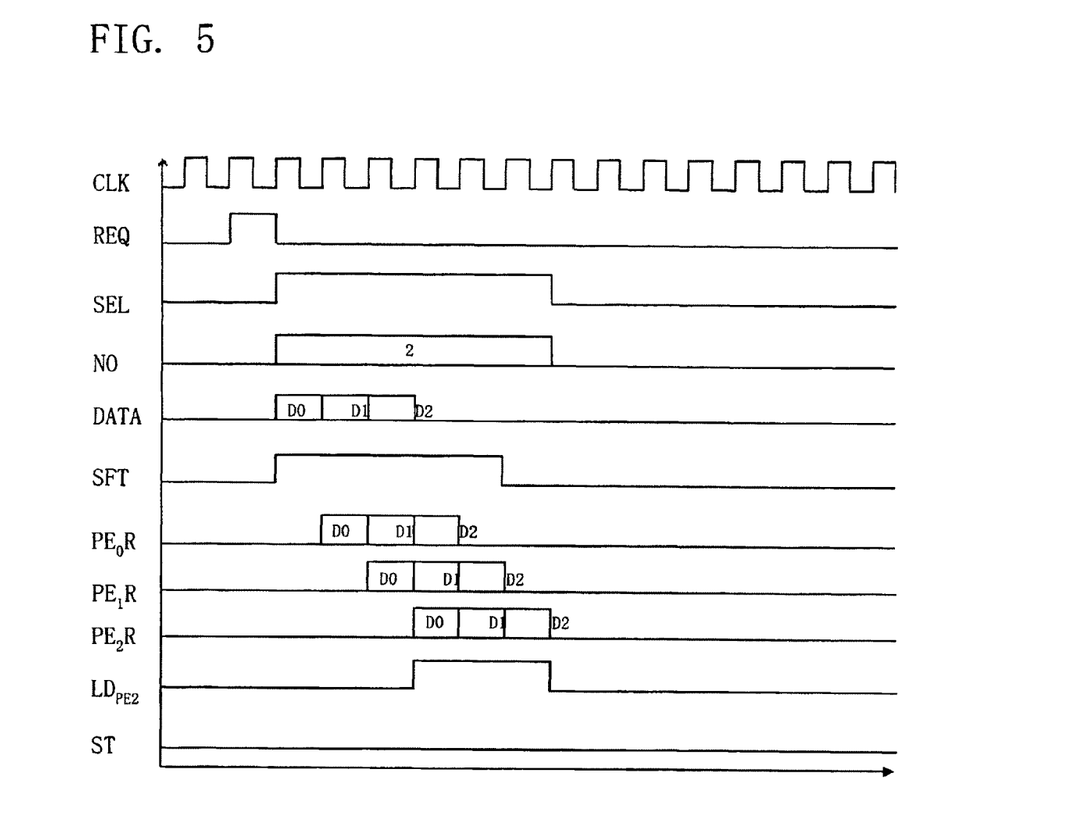
FIG. 5 is a timing chart of a data transfer from arbiter to processing element PE2 which is working in MIMD mode.

In a system as shown in FIG. 4 different transfer methods can be provided for the different PE control styles. For a request REQ from a PE operating in MIMD mode after selection of a current active PE has been done inside the arbiter, a data transfer is initiated and controlled by the arbiter as shown in the timing block diagram in FIG. 5 for an example read transfer of the three byte D0, D1 and D2 from arbiter to the self-controlled processing element PE2. The data is transferred over the registers of the pipelined ring bus $PE_nR$ and then stored inside the desired PE by setting the signals PE select (SEL), PE number (NO), register shift (SFT), data load (LD) and data store (ST) inside the arbiter correctly and transferring those signals directly to the PEs to set there the paths in a desired way.

Figure 6:
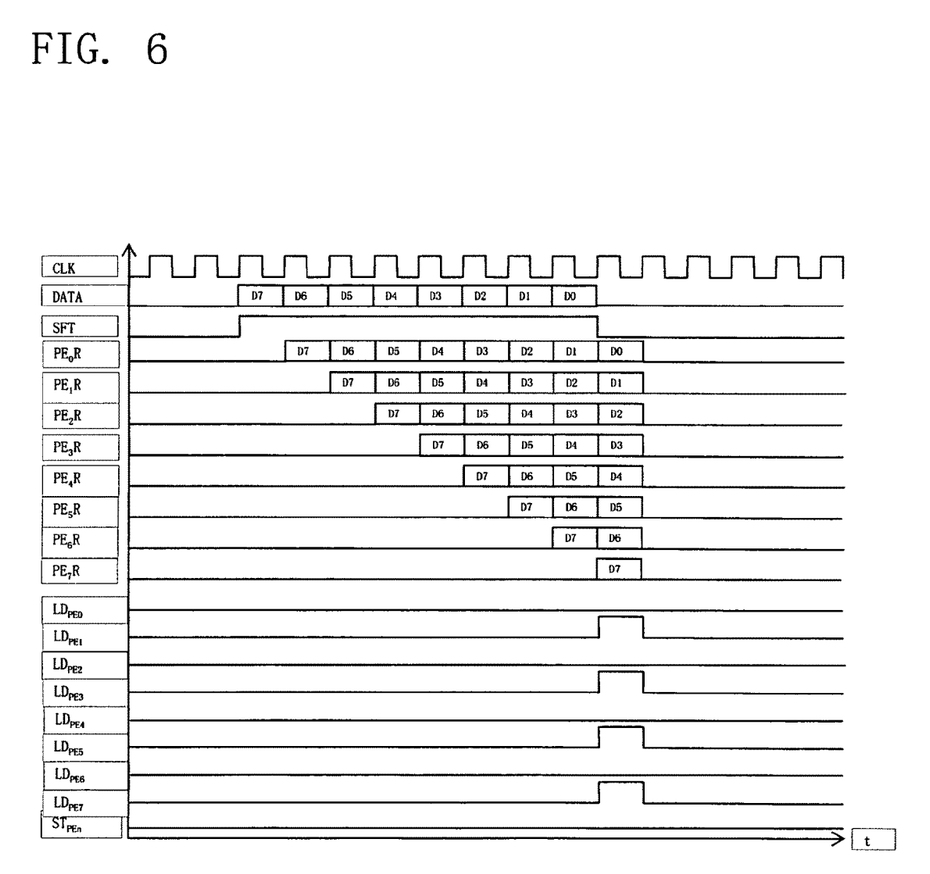
FIG. 6 is a timing chart of a data transfer from arbiter to all PEs working in SIMD mode.

In contrast to the data transfer request from a PE operating in MIMD mode where for a read request data is only sent to one PE IMEM at a time, in SIMD mode, the IMEM from all PEs operating in SIMD mode (active) are filled at the same time. Therefore, first the data D0 till D7 is transferred from the arbiter to all registers of the pipelined ring bus $PE_n$ R and then for the currently active PEs the data is loaded from the register to the memory modules as shown in the timing chart in FIG. 6. For the read request in the example architecture from FIG. 1 with eight PEs where all odd PEs are active in SIMD mode only for these active PEs the data load control signal ($LD_{PE_n}$) is set in one clock cycle at the end of the transfer to one, the other data load control signals as well as all data store control signals ($ST_{PE_n}$) are not changed and they hold the value zero.

The knowledge inside the arbiter about the kind of current transfer to IMEM is provided by the requesting source. For MIMD mode, it is a self-controlled PE and for SIMD mode, it is the GCU, while the decision, whether a PE is working in self- or common controlled mode is done in the access controller of the arbiter.

The following example is given for better illustration of the present invention.

In the dual mode single instruction multiple data (SIMD)/ multiple instruction multiple data (MIMD) architectures data has to be transferred between an external memory and processing elements having an internal memory (IMEM), which results in a problem for the data bus because of the large wiring area requirements, in case with architectures with many PEs.

This problem can be solved by a newly proposed formulation for architectures with PEs, each can be either self-controlled or common controlled, such as dual mode SIMD/ MIMD architectures will reduce this wiring area requirement by using, as network for data transfer, a pipelined bus system, preferably formed as a ring, connecting all PEs and the global control unit with external memory arbiter sequentially. Data transfers over such kind of network can then be preformed for one single PE in MIMD mode at a time, e.g. for a data transfer to a PE IMEM by shifting the data from the arbiter over the pipelined (ring) bus to the destination PE and by opening there the path to the IMEM while closing the paths to all the other PE IMEM units. In contrast, for SIMD mode the data is sent to all the common controlled PEs at the same time by releasing the data words from the arbiter to the bus in correct order and by shifting them over the pipelined (ring) bus till the data words have reached their destination register on the pipelined bus. After this, the data is stored at the same time from all the common controlled PEs to the IMEM units by setting the open paths to the IMEM units only for the common controlled PEs.

INDUSTRIAL APPLICABILITY

This invention can be used to achieve a high performance processor design in low cost for embedded systems.

It should be noted that other objects, features and aspects of the present invention will become apparent in the entire disclosure and that modifications from the disclosed embodiments may be done without departing the scope of the present invention claimed as appended herewith.

Also it should be noted that any combination of the disclosed and/or claimed elements, matters and/or items may fall under the modifications aforementioned.

What is claimed is:

1. A processor comprising a dual mode single instruction, multiple data stream/multiple instruction stream, multiple data stream (SIMD/MIMD) architecture, the processor comprising:
    a global control unit;
    first processing elements configured to operate in a SIMD mode and to execute a same program of the global control unit;
    second processing elements configured to operate in a MIMD mode and configured to execute their own program independently from other processing elements programs;
    a pipelined network connecting said first processing elements and said second processing elements sequentially; and
    an arbitration unit including an access controller comprising access control lines, each access control line being connected to each processing element of said first and second processing elements to control data access timing between each processing element and said network,
    wherein said data access for said first processing elements comprises a concurrent access so that each of said first processing elements accesses said network at a same timing slot,
    wherein said data access for said second processing elements is comprises a stand-alone access so that each of said second processing elements accesses said network independently, and
    wherein said arbitration unit is configured to arbitrate a data transfer request for the first processing elements from the global control unit and data transfer requests for the second processing elements accesses from the second processing elements in such a manner that said access controller assigns a higher priority to one stand-alone access than to a concurrent access or to other stand-alone accesses when assigning the data access timing to each processing element via a respective control line, or said access controller assigns a higher priority to a concurrent access than a stand-alone access when assigning the data access timing to each processing element via the respective access control line.

2. The processor as defined in claim 1, wherein a relation of data access timings from said first processing elements and said data access timings from said second processing elements is different.

3. The processor as defined in claim 1, wherein said access controller controls said network so as to achieve an increased efficiency in a use of said network.

4. The processor as defined in claim 1, wherein said access controller controls said network to hold a specified bus access waiting time for one processing element.

5. The processor as defined in claim 3, wherein said access controller controls said network to hold a specified bus access waiting time for each processing element.

6. The processor as defined in claim 3, wherein said access controller decides a data access timing of each processing element to minimize a necessary duration to send required data.

7. The processor as defined in claim 3, further comprising a plurality of processing elements, each one of the plurality of processing elements being configurable as one of said first processing element and said second processing element, and
    wherein said access controller decides which one of said plurality of processing elements is to be used as said first processing element and which processing element is to be used as said second processing element.

8. An arbitration unit comprising an access controller and access control lines for a processor having a dual mode SIMD/MIMD architecture, and further comprising a global control unit and an arbitration unit,
    wherein each access control line is connected to a respective processing element of a plurality of processing elements, said processing elements comprising:
        first processing elements configured to operate in a SIMD mode and to execute a same program of said global control unit; and
        second processing elements configured to operate in a MIMD mode and to execute their own program independently from other processing elements programs,
    wherein said first and second processing elements are sequentially connected with a pipelined network of the processor for data transfer,
    wherein said access controller controls a data access timing between each processing element and said pipelined network,
    wherein a data access for said first processing elements is a concurrent access so that each of said first processing elements accesses said network at a same timing slot,
    wherein a data access for said second processing elements comprises a stand-alone access so that each of said second processing elements accesses said network independently, and
    wherein the arbitration unit is configured to arbitrate a data transfer request for said first processing elements from the global control unit and data transfer requests for the second processing elements from the second processing elements such that said access controller assigns a higher priority to said stand-alone access than to a concurrent access or to other stand-alone accesses when assigning the data access timing to each respective processing element via a respective control line, or said access controller assigns a higher priority to a concurrent access than a stand-alone access when assigning the data access timing to each processing element via the respective access control line.

9. The arbitration unit as defined in claim 8, wherein a relation of said data access timings from said first processing elements and said data access timings from said second processing elements is different.

10. The arbitration unit as defined in claim 8, wherein said access controller controls said network to achieve an increased efficiency in a use of said network.

11. The arbitration unit as defined in claim 8, wherein said first and second processing elements comprise a plurality of processing elements that are selectively configurable as one of either of said first processing element and said second processing element, and wherein said access controller decides which processing element is used as said first processing element and which processing element is used as said second processing element.

12. The arbitration unit as defined in claim 11, wherein said first processing element comprises a SIMD architecture processing element, and wherein said second processing element comprises a MIMD architecture processing element.

13. The arbitration unit as defined in claim 8, wherein said pipelined network comprises a pipelined ring network.

14. A method of controlling an access controller comprising access control lines for a processor comprising a dual mode SIMD/MIMD architecture, the processor comprising a global control unit; first processing elements configured to operate in a SIMD mode and to execute a same program of said global control unit; second processing elements configured to operate in a MIMD mode and to execute their own program independently from other processing elements programs; a plurality of access control lines, each one of the plurality of access control lines being connected to one processing element of said first processing elements and said second processing elements; and a pipelined network configured to data transfer, the data transfer connecting said first processing elements and said second processing elements sequentially, wherein the method comprises:

controlling a data access timing between each processing element and said pipelined network by said access controller, the data access for said first processing elements being a concurrent access so that each of said first processing elements access said network at a same time, and said data access for said second processing elements being a stand-alone access so that each of said second processing elements accesses said network independently; and arbitrating a data transfer request for said first processing elements from the global control unit and data transfer requests for the second processing elements from the second processing elements such that said access controller assigns a higher priority to a stand-alone access than to a concurrent access or to other stand-alone accesses when assigning the data access timing to each processing element via a respective control line, or said access controller assigns a higher priority to a concurrent access than a stand-alone access when assigning the data access timing to each processing element via the respective access control line.

* * * * *